United States Patent [19]
Matsumoto et al.

[11] Patent Number: 4,639,071
[45] Date of Patent: Jan. 27, 1987

[54] LIGHT SCANNING APPARATUS

[75] Inventors: Seikichi Matsumoto, Sano; Hiroyuki Ikeda, Yokohama, both of Japan

[73] Assignee: Fujitsu Limited, Kawasaki, Japan

[21] Appl. No.: 833,579

[22] Filed: Feb. 26, 1986

Related U.S. Application Data

[63] Continuation of Ser. No. 271,046, Jun. 5, 1981, abandoned.

[30] Foreign Application Priority Data

Jun. 6, 1980 [JP] Japan .................................. 55-76137

[51] Int. Cl.[4] .............................................. G02B 26/10
[52] U.S. Cl. .................................................... 350/3.71
[58] Field of Search ......................................... 350/3.71

[56] References Cited

U.S. PATENT DOCUMENTS

| | | | |
|---|---|---|---|
| 3,972,582 | 8/1976 | Oosaka et al. | 350/3.71 |
| 4,094,576 | 6/1978 | Heiling | 350/3.71 |
| 4,165,464 | 8/1979 | Ikeda et al. | 350/3.71 |

FOREIGN PATENT DOCUMENTS

| | | | |
|---|---|---|---|
| 54-68647 | 6/1979 | Japan | 350/3.71 |
| 56-47019 | 4/1981 | Japan | 350/3.71 |
| 2024449 | 1/1980 | United Kingdom | 350/3.71 |

OTHER PUBLICATIONS

Rimmer, M. P., "Optical Design for a Holographic Scanning System", SPIE, vol. 103, Systems Integration and Optical Design II, 1977.

*Primary Examiner*—Bruce Y. Arnold
*Attorney, Agent, or Firm*—Staas & Halsey

[57] ABSTRACT

A light scanning apparatus for scanning with a reconstruction beam by shifting a hologram relative to the reconstruction beam, wherein scanning is possible for freely selected curves and/or straight lines with the reconstruction beam, depending upon the ratio, M, of the wavelength of the reconstruction beam to that of the coherent light beam which was used for generating the hologram.

11 Claims, 14 Drawing Figures

LIGHT SCANNING APPARATUS

This is a continuation of co-pending application Ser. No. 271,046 filed on June 5, 1981, now abandoned.

BACKGROUND OF THE INVENTION

The present invention relates to an apparatus for scanning a coherent laser beam by relatively moving a hologram which has the function of converging the light beam for the coherent laser beam, and particularly to a light scanning apparatus which is capable of obtaining a desired scanning locus on a desired surface.

The light scanning apparatus according to the present invention can be applied to any system, for example, to an apparatus which reads the bar code printed on a medium such as a price card by scanning it with the light beam, an apparatus for printing letters or figures on a light-sensitive medium by scanning it with a modulated light beam, or into an apparatus which checks complicated printed patterns.

On the other hand, various light scanning apparatuses are already proposed, however those proposed in the U.S. Pat. No. 3,619,033, "Holographic Laser Beam Deflector" by R. V. Pole et al, in Applied Optics Vol. 14, No. 4, April 1975, U.S. Pat. No. 3,953,105, U.S. Pat. No. 4,094,576 and U.S. Pat. No. 4,165,464 are known as light scanning apparatuses for scanning a light beam with comparatively simplified structures.

Namely, the U.S. Pat. No. 3,619,033 describes an apparatus which has the structure that the hologram is arranged on disk, wherewith the laser beam source for reproduction is radiated and the laser beam is scanned through the rotation of the disk.

However, the scanning locus obtained on the medium by scanning the laser beam becomes an arc having a curvature according to the radius of the disk. Therefore such prior art has a disadvantage that the scanning of a straight line or other curve is impossible.

The paper by R. V. Pole et al. introduces the technology wherein a laser beam is radiated from the center of a drum to the cylindrical surface thereof on which the hologram is arranged, and thereby a straight scanning locus is obtained. However, this technology allows the scanning only of straight lines, but not for other freely selected curves. Moreover, it also provides such a disadvantage that preparation of the hologram is difficult because it must be prepared on the drum.

The U.S. Pat. No. 3,953,105 and U.S. Pat. No. 4,049,576 disclose, respectively, an apparatus for scanning the light by arranging hologram on the disk and radiating the laser beam thereto. Moreover, these prior art patents disclose the technology that the scanning locus is compensated using a compensating optical system such as a cylindrical lens, and thereby the desired scanning locus can be obtained.

However, even in this technology, only the curves having the curvature determined by the diameter of the disk can be obtained as a scanning locus obtained by the hologram if no compensating optical system is employed.

Moreover, the U.S. Pat. No. 4,165,464 discloses an apparatus for scanning by radiating the laser beam to the hologram arranged on a rotating disk.

However, this U.S. Pat. No. 4,165,464 also has a disadvantage that a desired curved scanning locus or straight scanning locus cannot be obtained.

Namely, the hologram used for such apparatus is so prepared that the laser beam is converged to a specified converging point. But, since the hologram arranged on the disk rotates in the form of an arc, the converging point also rotates in such a manner as to possess in common the center of the rotating disk. Therefore, the light beam is diffracted on a circle with a radius which is equal to the length between the converging point of the hologram arranged on the disk and the rotating center.

SUMMARY OF THE INVENTION

It is the first object of the present invention to offer a light scanning apparatus which can obtain a straight or curved scanning locus without using a compensating optical system.

It is the second object of the present invention to offer a small size light scanning apparatus which assures linear scanning.

It is the third object of the present invention to offer a small size light scanning apparatus which assures long linear scanning.

The other objects of the present invention will become obvious from the following explanation.

In order to attain such objects, the present invention has focused attention on the fact that the converging position of a reconstruction beam changes in accordance with the laser beam radiation location when the wavelength of the coherent light used as the reference and object waves at the time of generation is different from that of the reconstruction beam.

DETAILED DESCRIPTION OF THE PREFERRED EMBODIMENTS

Figure 1A:
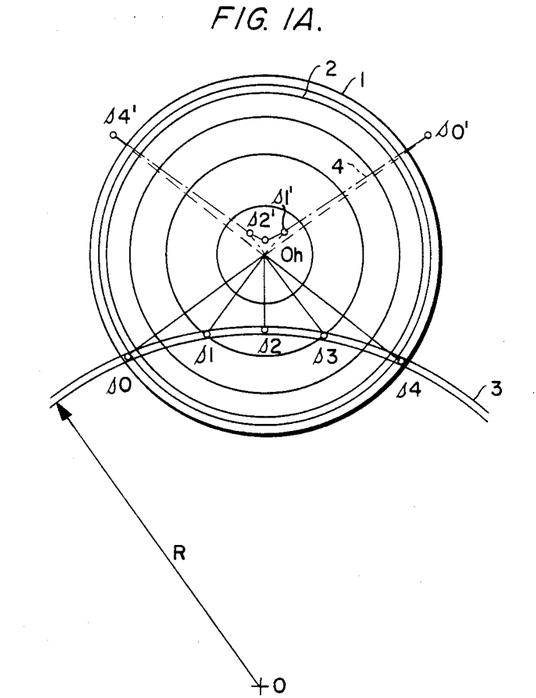
FIGS. 1a, 1b and 1c are given for explaining the principle of an embodiment of the present invention.
Figure 1B:
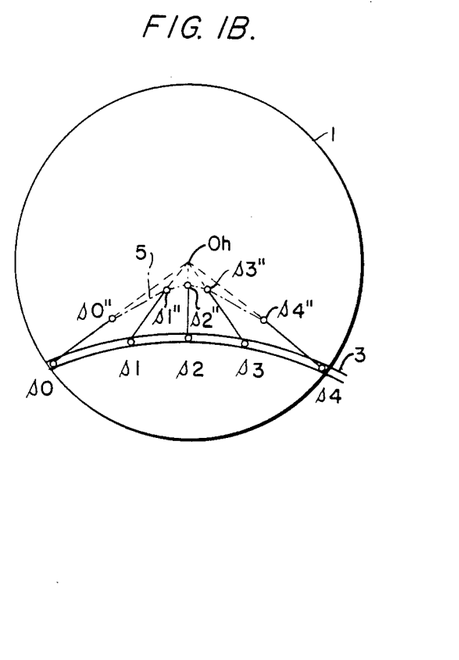

FIGS. 1A and 1B show the front view of a hologram and explain the diffracting condition of the light beam.

In these figures, 1 is the hologram disk; 2 is the grating, 3 is the locus of the reconstruction beam on the hologram disk, Oh is the center of the hologram disk 1, s0, s1, s2, s3, s4 are reconstruction beam spots irradiated to the holoram disk 1, s0' to s4' and s0'' to s04'' are spots reconstructed on the focus point of the hologram disk 1, 4 and 5 are loci of spots reproduced on the focus point of the hologram disk 1 respectively.

The hologram disk 1 is made of a photo-sensitive material. Interference fringes are generated at the surface of the photo-sensitive material by interfering the coherent light of a spherical wave having its center on the center axis oh which is vertical to the paper surface and the coherent light of a plane wave in the case of this embodiment. These interference fringes are formed, in case the spherical wave is used, with higher density at the periphery and less toward to the center.

The hologram disk 1 having the interference fringes 2 thus obtained is reproduced.

When a reconstruction beam having a wavelength the same as that of the construction laser beam is irradiated onto the hologram disk 1, the laser beam can be reconstructed in such a manner as converging to the focus of the hologram disk 1.

However, in case the wavelength of the reconstruction light beam is longer than that of the construction light beam, the reconstruction beam goes more sharply toward the center of the optical axis of the hologram disk than the ordinarily reproduced laser beam above.

Therefore, when the reconstruction beam is scanned so that the scanning locus 3 is obtained on a circle with the radius R that which an area including part of the hologram disk 1, the scanning locus 4 of the reproduced converging point is indicated by the dash-and-dot line in FIG. 1a. Namely, usually the reconstruction beam irradiated to the spot s0 is diffracted toward the center axis oh direction by the grating 2. However, when the wavelength becomes longer than that of the original light beam, the diffraction angle toward the center axis becomes wider and the light is converged to the point s0'. In the case the light is irradiated to the spots s1, s2, s3, s4, the diffraction also becomes large and the light is therefore converged to the spots s1', s2', s3' and s4' respectively. In other words, aberration is generated.

Here, it is supposed that the diffraction angle at the edge of the hologram disk 1 is wider than that at the center because the density of the diffraction grating of the hologram disk 1 is higher than that of the center.

Moreover, when the wavelength of the reconstruction beam becomes smaller than that of the original light beam, the diffraction angle of the reconstruction beam becomes smaller than that when the hologram is reconstructed with the ordinary light beam (the light having the same wavelength of the original light).

For this reason, in case the reconstruction beam is scanned with the scanning locus 3 similar to that in FIGS. 1A, and B the converging points are distributed to s0'', s1'', s2'', s3'' and s4'' in accordance with the location of the spots s0, s1, s2, and s3 and s4, namely as separated on the locus 5. In other words, aberration is generated.

Focusing on this phenomenon of the hologram disk, the inventors of the present invention have made it possible to freely set the reconstructed scanning locus.

Figure 1C:
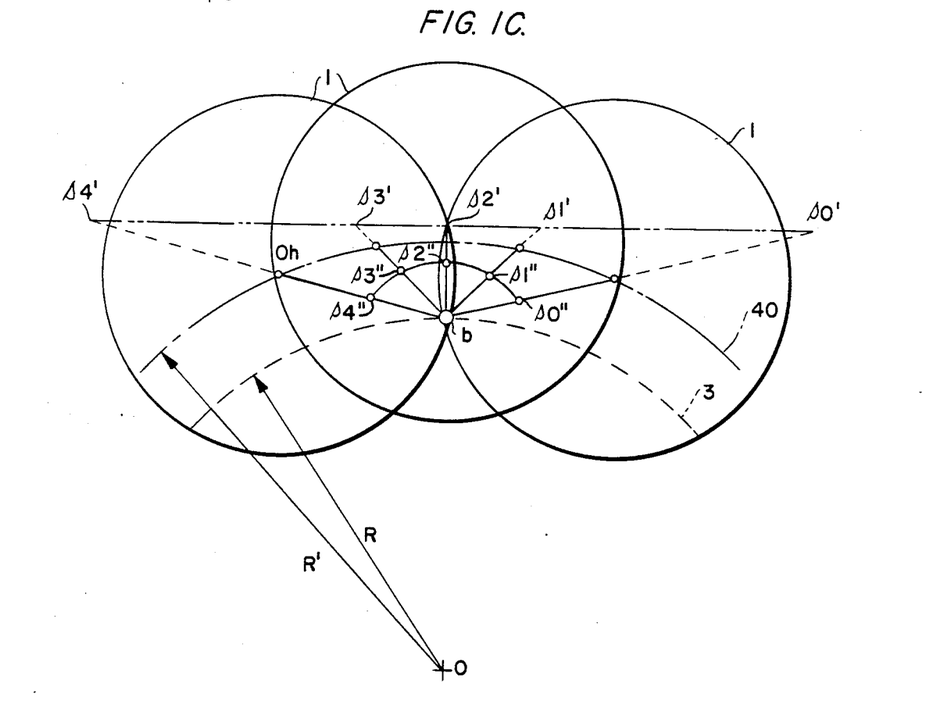

An example of such a concept will be explained. FIG. 1C shows an example wherein the hologram disk 1 used in FIG. 1A is moved in such a manner that the center axis Oh shifts on the circle with the center 0, and the reconstructed spots are scanned by irradiating the reproduced light while it is fixed at the point b of FIG. 1C.

In this case, when the wavelength of the reconstruction beam is equal to that of the original light, the spots are reproduced on the locus 40 of the center axis oh.

However, when a reconstruction beam of wavelength different from that of the original light is used, the reconstructed spots are moved on a locus according to the combination of said aberration and the locus of motion of the hologram disk 1. Therefore, when the reconstruction beam the same as that used in FIG. 1A is used, the locus of aberration of the hologram disk is combined with the locus of motion of the hologram, and thereby the spots s0', s1', s2', s3' and s4' are reconstructed on almost a linear line.

When the same reconstruction beam as that used in FIG. 1B is used, the reconstructed spots s0'', s1'', s2'', s3'' and s4'' are constructed on a curve having a radius of curvature which is smaller than the circular shift locus of the center axis oh.

Next, the scanning locus of these reconstructed spots is investigated.

Figure 2:
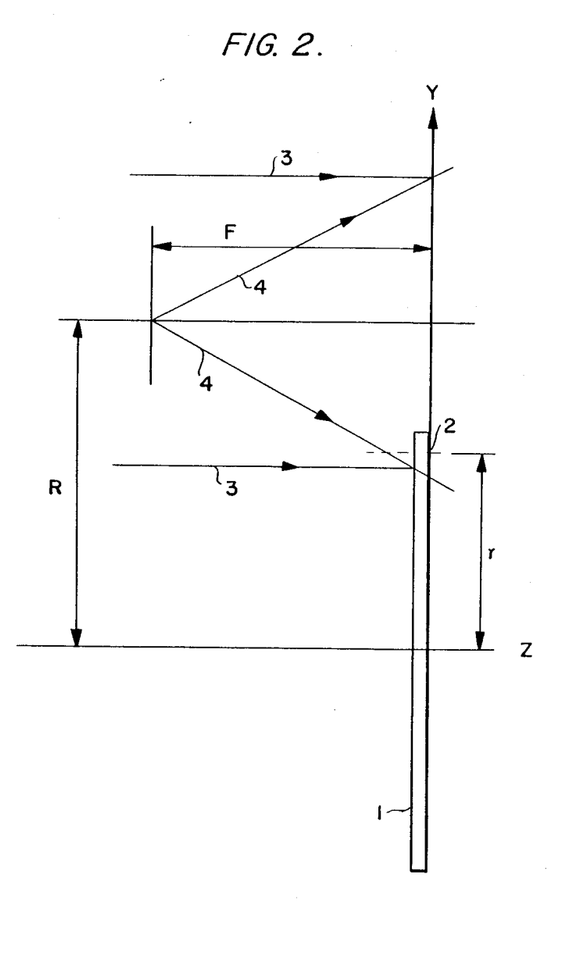
FIG. 2 explains an embodiment of the method of preparing the hologram.

FIG. 2 shows a hologram obtained by interference of a plan wave and a sherical wave as an example of the method of generating a hologram disk.

In the same figure, a hatched hologram 2 is formed at the periphery of the disk 1 having a center axis Z. The plane wave 3 and the spherical wave 4 having its origin at the point with coordinates (F,R) are interfered by applying these waves orthogonally to the surface of the disk having its axis on the Z axis and then the hologram is picked up by gradually rotating the disk for specified angles around the Z axis thereby a hologram disk wherein the holograms are arranged in the form of concentric rings on the disk can be obtained.

Figure 3:
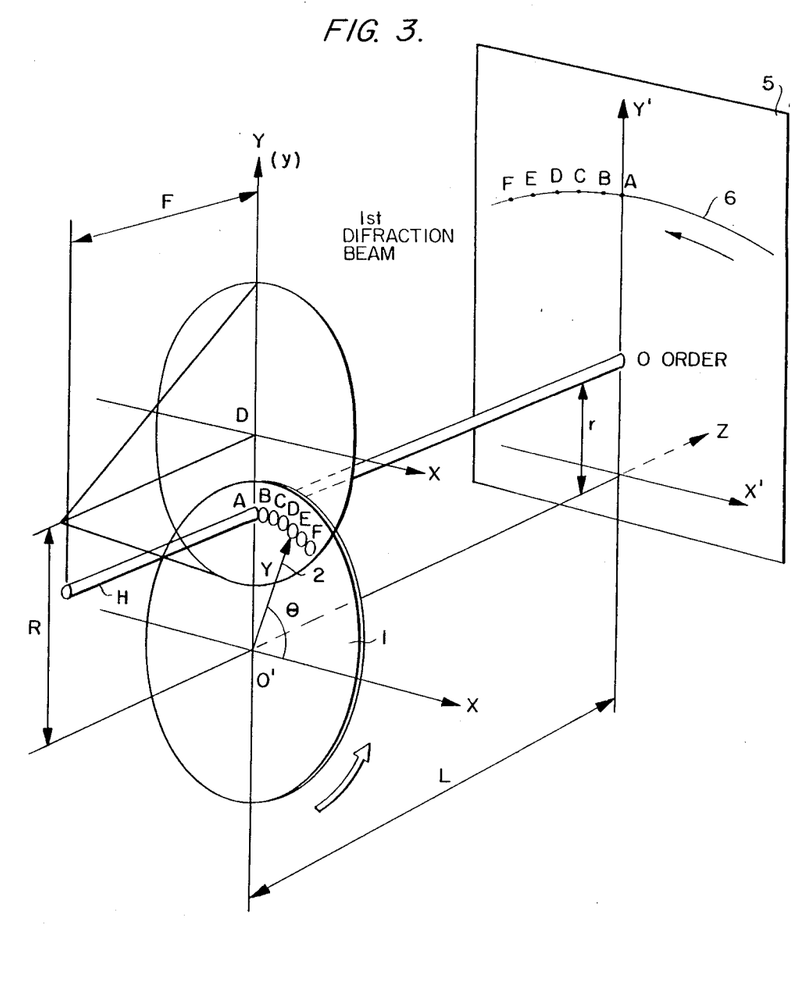
FIG. 3 explains the reconstructing operation of the light scanning apparatus for reconstructing the hologram prepared in the form of FIG. 2.

FIG. 3 shows the reconstruction operation of the hologram scanning apparatus and the scanning lines on the screen of the plane including the converging point.

In this FIG. 3, the hologram disk 1 is rotating relative to the reproduced laser beam H which enters the point A at the radius r of the hologram 2. After specified periods, the points B, C, D, E and F reach the position of point A and the scanning line 6 on the screen is formed in the succession of points A→B→C→D→E→F, corresponding to the respective reconstructed points. Usually, this scanning line forms an arc.

In order to make obvious the influence of the reconstructed wavelength on the scanning line 6, calculated below is the scan coordinate on the screen 5 corresponding to the rotation of the disk 1.

The scan coordinate in the screen (X', Y') plane is expressed using the parameters in FIG. 3. In addition, analysis is performed using the plane polar coordinates (r, $\theta$) with the rotation center of the disk considered as the origin 0. The phase distribution on the hologram is expressed by the phase function $\Phi$ (r, $\theta$). If the wavelength used for generating the hologram is considered as $\lambda_c$ and the coordinates of the focus of the spherical wave is considered as (F, R), then the phase function $\Phi$ (r, $\theta$) can be expressed as follow.

$$\Phi (r, \theta) = \frac{2\pi}{\lambda_c} ( \sqrt{F^2 + r^2 - 2rR\sin\theta + R^2} - F) \quad (1)$$

The spatial frequency of the interference fringes in the r axis direction and $\theta$ axis direction at the point (r, $\theta$) can be calculated from this phase function $\Phi$ (r, $\theta$). When the elements in the r direction and $\theta$ direction of the spatial frequency are respectively considered as $f_r(r, \theta)$ and $f_\theta (r, \theta)$, the following relation can be obtained.

$$f_r(r, \theta) = \frac{1}{2\pi} \frac{\partial \Phi}{\partial r} \quad (2)$$

-continued $$= \frac{1}{\lambda_c} \frac{|r - R\sin\theta|}{\sqrt{F^2 + r^2 - 2rR\sin\theta + R^2}} \quad (3)$$

$$f_\theta(r, \theta) = \frac{1}{2\pi} \frac{1}{r} \frac{\partial \Phi}{\partial \theta} \quad (4)$$

$$= \frac{1}{\lambda_c} \frac{|R\cos\theta|}{\sqrt{F^2 + r^2 - 2rR\sin\theta + R^2}} \quad (5)$$

Figure 5:
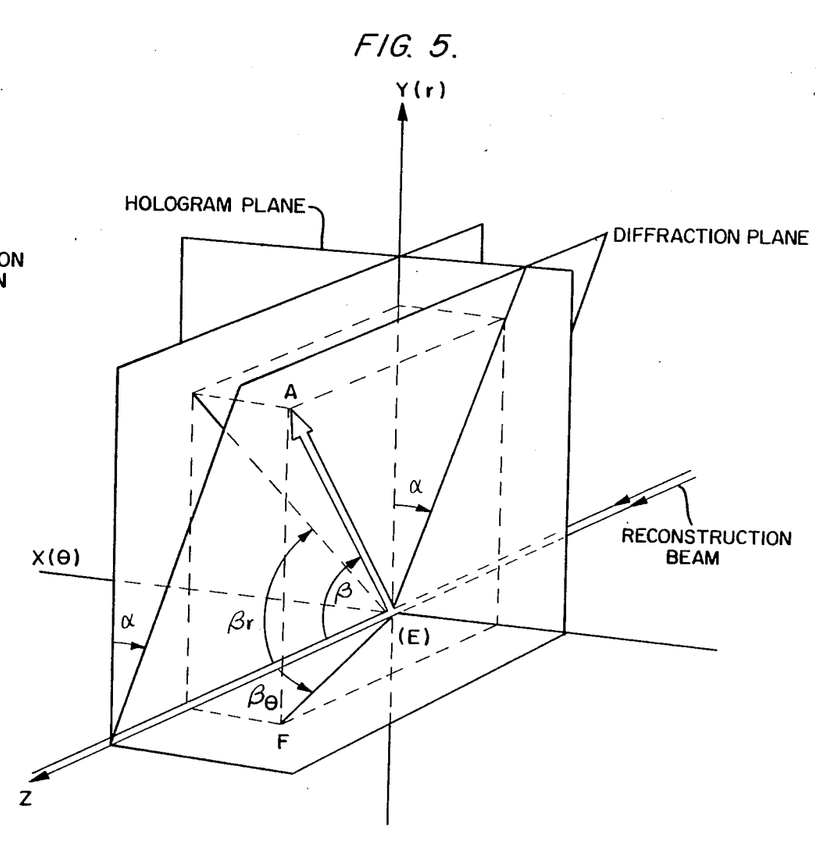

Setting $d\Phi = 2$ provides the quantities $$dr = \frac{1}{f_r(r, \theta)} \quad (6)$$

$$d\theta = \frac{1}{f_\theta(r, \theta)} \quad (7)$$

which represent the pitches of interference fringes in (FIG. 5) the r and $\theta$ directions.

Figure 4:
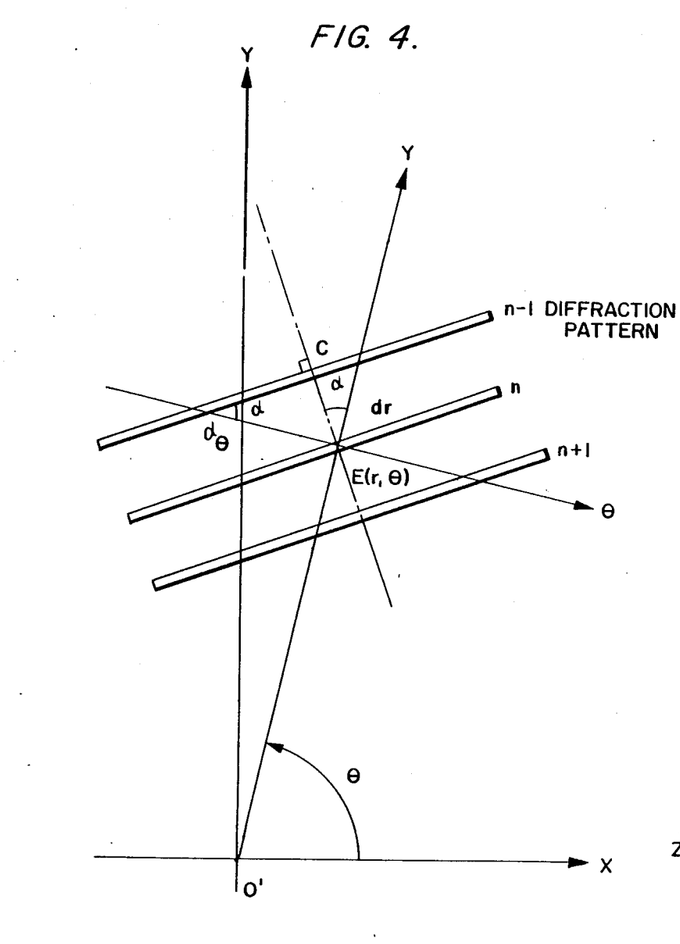
FIG. 4 and FIG. 5 define the parameters of the function indicating the hologram locus.

FIG. 4 is an enlarged view of the interference fringes at the point E (r, $\theta$). In this figure, the laser beam H for reconstruction orthogonally crosses the hologram disk surface (x,y) and enters the point E.

The primary diffracted beam of the hologram 2 proceeds into the deflected plane with the deflection angle $\beta$ in the CE direction orthogonally crossing the interference fringes.

At this time, the gradient $\alpha$ of the deflected plane from the r direction and the deflection angle $\beta$ of the primary diffracted beam can be obtained from the equations (6), (7) and (3), (5). Namely, a gradient of the deflected plane is expressed as follows.

$$\alpha = \tan^{-1} \frac{dr}{d\theta} \quad (8)$$

$$= \tan^{-1} \frac{f_\theta}{f_r} \quad (9)$$

$$= \tan^{-1} \frac{|R\cos\theta|}{|r - R\sin\theta|} \quad (10)$$

The deflection angle $\beta$ can be expressed as follows from the basic equation of diffraction when the reproduced wavelength is considered as $\lambda_R$.

$$\beta = \sin^{-1} \frac{\lambda_R}{EC} \quad (11)$$

$$= \sin^{-1} \frac{\lambda_R \cdot f_r}{\cos\alpha} \quad (12)$$

$$= \sin^{-1} \left\{ \left(\frac{\lambda_R}{\lambda_C}\right) \left(\frac{1}{\cos\alpha}\right) \frac{|r - R\sin\theta|}{\sqrt{F^2 + r^2 - 2rR\sin\theta + R^2}} \right\} \quad (13)$$

FIG. 5 shows the diffraction condition viewed from the direction of the Z axis, when the hologram disk 1 rotates and the point E reaches the point A.

Here, $\overline{AE}$ is the unit vector in the direction of the primary diffracted beam. The scan coordinates X', Y' on the screen can be expressed as follows when the deflection angles $\beta_r$, $\beta_\theta$ in the Y direction (matching the r direction) and X direction ($\theta$ direction) are known.

$$X' = L \tan\beta_\theta \quad (14)$$

$$Y' = L \tan\beta_r + r \quad (15)$$

$\beta_\theta$, $\beta_r$ can be expressed by the following equations because these are related to $\alpha$, $\beta$ from FIG. 5.

$$\tan\beta_r = \tan\beta \cos\alpha \quad (16)$$

$$\tan\beta_\theta = \tan\beta \sin\alpha \quad (17)$$

From the equations (14), (15) and (10), (13), the coordinates X', Y' of the reconstructed spots can be obtained.

$$X' = L \tan\beta \sin\alpha \quad (18)$$

$$Y' = L \tan\beta \cos\alpha + r \quad (19)$$

$$\alpha = \tan^{-1} \left| \frac{R\cos\theta}{r - R\sin\theta} \right| \quad (20)$$

$$\beta = \sin^{-1} \left\{ \left(\frac{\lambda_R}{\lambda_c}\right) \left(\frac{1}{\cos\alpha}\right) \frac{|r - R\sin\theta|}{\sqrt{F^2 + r^2 - 2rR\sin\theta + R^2}} \right\} \quad (21)$$

The relation between the scan coordinates and the hologram construction and reconstruction conditions becomes obvious from the above explanation. Namely, the equations (20) and (21) teach that the scan coordinates depend on the following three factors.

(1) Hologram construction and reconstruction wavelength ratio ($\lambda_R/\lambda_c$)
(2) Radius of hologram disk (r)
(3) Parameter of hologram construction (R, F)

These parameters R and F also give the crossing angle $\delta$ between the spherical wave and plane wave of the hologram at the position (point A) of the disk radius.

$$\delta = \tan^{-1} \left(\frac{R - r}{F}\right) \quad (22)$$

The scan locus is determined through the inter-relation of the abovementioned three factors. The above equation teaches that for when the radius r up to the light beam irradiation location, the distance R from the disk center to the center of the optical axis and the distance F from the spherical wave irradiation position to the hologram are determined, the scanning locus changes depending on the ratio of the reconstruction wavelength $\lambda_R$ and the construction wavelength $\lambda_C$ of the hologram.

Figure 6:
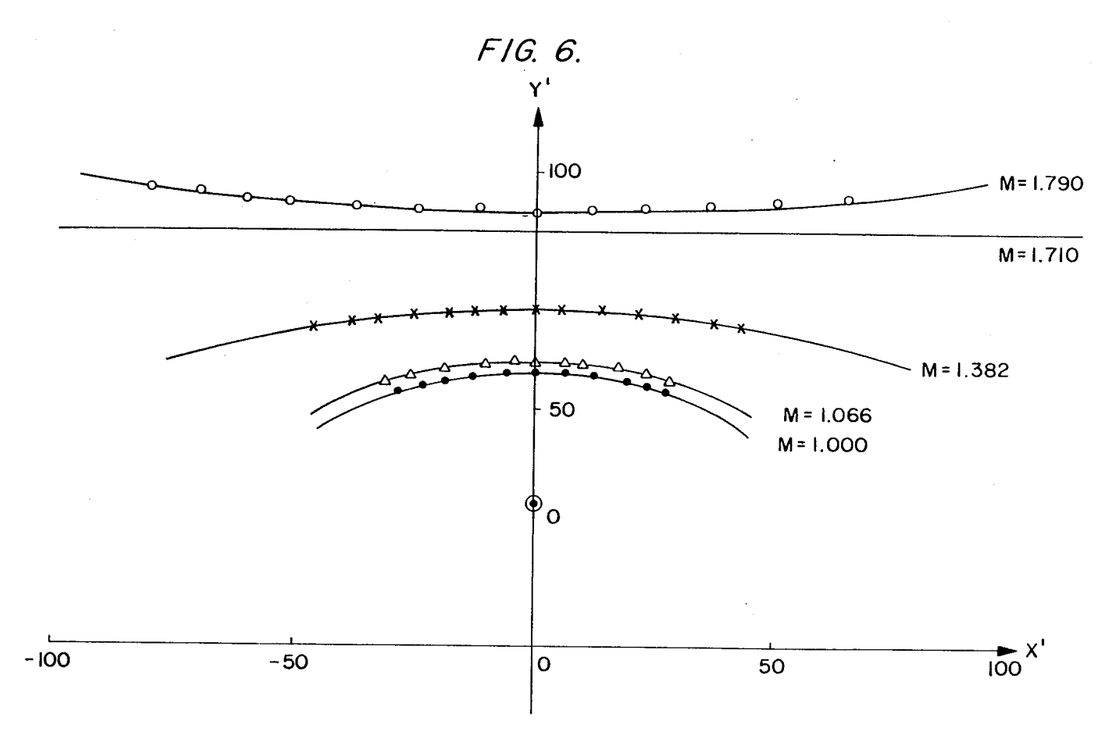
FIG. 6, FIG. 8 and FIG. 10 show the light scanning loci obtained when the laser beam is scanned using the holograms prepared by different embodiments of the present invention.

On the basis of the abovementioned theoretical equations, actual calculations have been conducted for practical examples adopting respective values and thereafter verifications have also been conducted by experiments. FIG. 6 shows the characteristics of an embodiment of the present invention.

Namely, with disk radisu r=65 mm, coordinates of focus of spherical wave F=100 mm, R=106.8 mm, screen distance L=300 mm, for wavelength ratio $M=\lambda_R/\lambda_C$ changed between 1.0, 1.066, 1.382, 1.790, the coordinates X, Y on the screen are calculated using the equations (18) to (21) and the results are plotted in FIG. 6. It corresponds to the case where the hologram construction wavelength $\lambda_C$ is set to 457.9 nm and the reconstruction wavelength $\lambda_R$ is changed to 457.9 nm, 488 nm, 632.8 nm and 820 nm respectively.

This characteristic indicates that linearity of scanning locus can be improved by increasing the ratio of hologram construction wavelength $\lambda_C$ and reconstruction wavelength $\lambda_R$.

In regard to the length of the scanning line, when the hologram is reconstructed, for example, by the wavelength of 820 nm using a semiconductor laser, a scanning line reaches about 3 times (300 mm long) longer than the conventional one was obtained.

Figure 7:
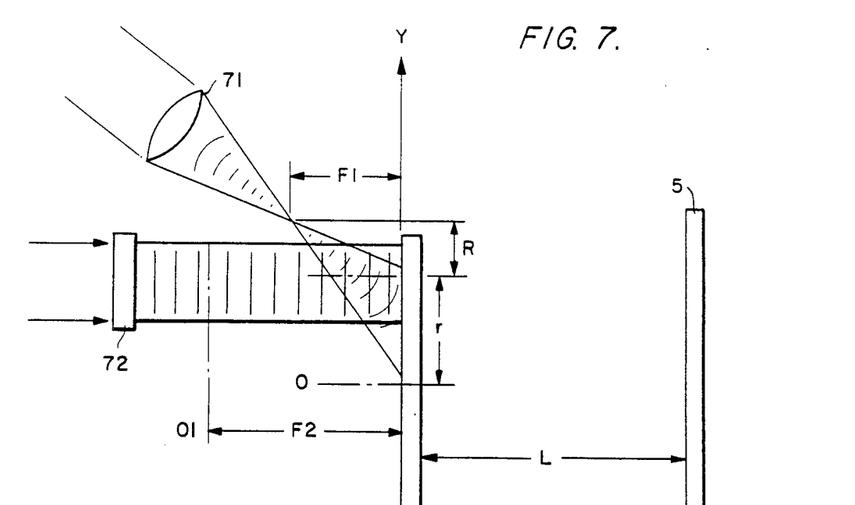
FIG. 7 explains the method of preparing and reproducing another embodiment of the present invention.

FIG. 7 shows another embodiment of the present invention. In this embodiment, the hologram is constructed using an object beam having a cylindrical wave and a reference beam of a spherical wave.

In the figure, 71 is the spherical lens, 72 is the cylindrical lens and 1 is the hologram disk. The coherent laser beam of plane wave is irradiated onto the spherical lens 71 and to cylindrical lens 72. The laser beam is converged to the spherical wave by the spherical lens 71. The other laser beam are converted to a cylindrical wave by the cylindrical lens 72. These laser beams which is subjected to wave surface conversion by the respective lenses forms the diffraction grating on the disk 1 in the same way as in the aforementioned embodiment.

Figure 8:
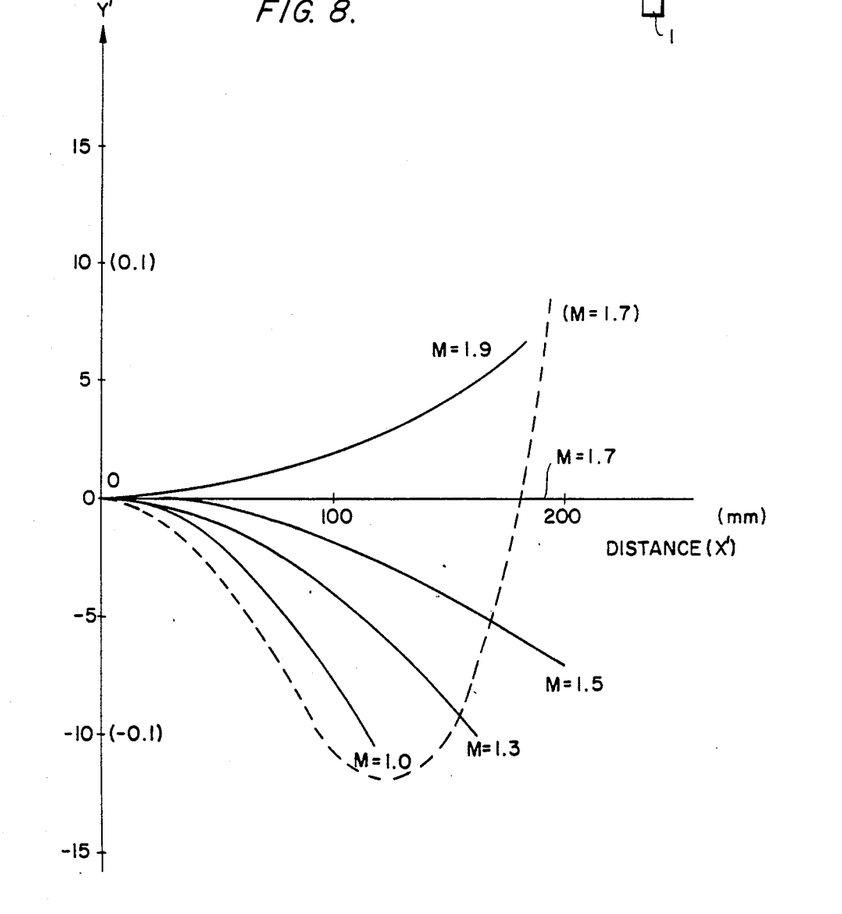

FIG. 8 shows the locus of each wavelength ratio of the reconstructed spots obtained by reconstructing the hologram as explained above by changing the wavelengths.

The parameters for obtaining FIG. 8 are as follow.

| | |
|---|---|
| Radius (r) of disk 1: | 50 (mm) |
| Distance from the converging point 01 of the cylindrical wave surface to hologram disk 1 ($F_2$): | 80.6 (mm) |
| Distance from the converging point 02 of spherical wave to hologram disk 1 ($F_1$): | 50.3 (mm) |
| Distance from the center of hologram disk of spherical wave to the edge of spherical wave (R): | 500 mm 20.1 (mm) |
| Distance up to the screen 5 (L): | |

In FIG. 8, the dotted line shows the scanning locus for the wavelength ratio of 1.7 which is greatly enlarged in the vertical direction (to show deviation from a straight line for which) the hologram construction wavelength $\lambda_C$ is 457.9 nm and the reconstruction wavelength $\lambda_R$ is 780 nm.) The Y-axis scale in this case is given in parentheses.

According to this figure, it is known that nearly linear scanning is possible even in this example within the scanning distance of ±200 mm. It is also understood that the deflection is within ±0.1 mm.

Figure 9:
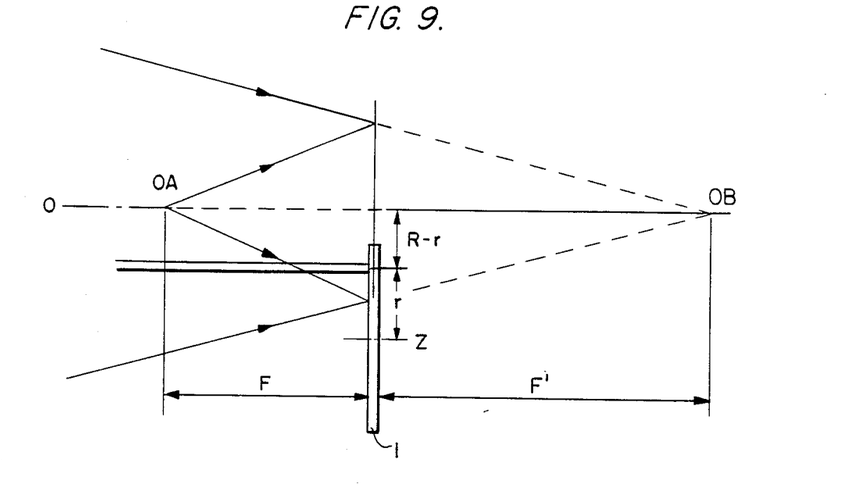
FIG. 9 explains the method of preparing and reproducing according to still another embodiment of the present invention.

FIG. 9 is a further embodiment of the present invention. In this embodiment, the hologram is constructed by interfering a converging spherical wave and a diverging spherical wave.

In the FIG. 9, the diverging spherical wave has the center OA of divergence on the axis O which is vertical to the plane including the hologram 1.

In addition, the converging point OB of the converging spherical wave is arranged at the location where it is opposing to the center OA of divergence on the axis O via the hologram surface.

Figure 10:
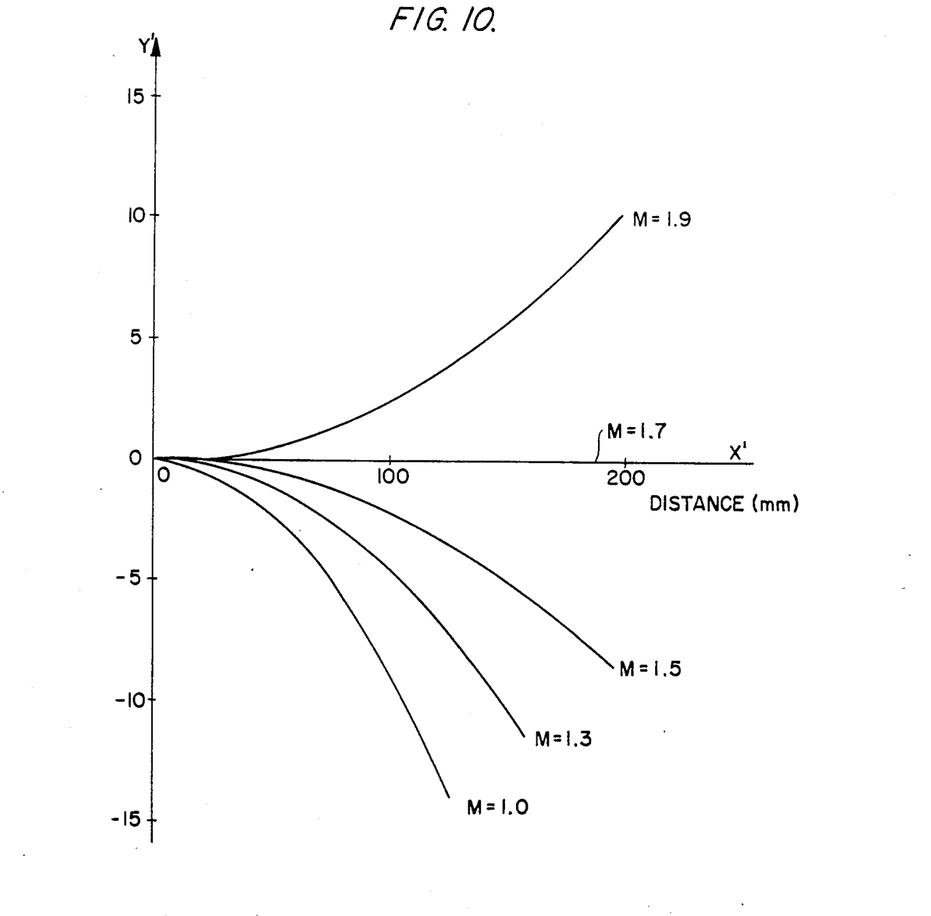

The parameters shown in the FIG. 9 are set as shown in the following table, and the scanning locus obtained thereby is shown in FIG. 10.

TABLE

| | |
|---|---|
| F | 189 mm |
| F' | 264.6 mm |
| R - r | 47.25 mm |
| r | 50 mm |
| L (distance up to the screen) | 500 mm |

In FIG. 10, the vertical axis coresponds to the Y' axis of the screen in FIG. 3 and indicates the amount of deviation from a straight line. The horizontal axis indicates the X' axis and means the distance from the origin of the X' and the Y' axis of the screen.

The converging beam for generating FIG. 10 is arranged symmetrically to the Y axis and the loci indicated by FIG. 10 are for the reconstructed light beam.

In addition, the values given to each curve are the wavelength ratio of the constructed and reconstructed light beams.

According to the FIG. 10, a light beam having almost a linear scanning locus can be reconstructed.

Figure 11:
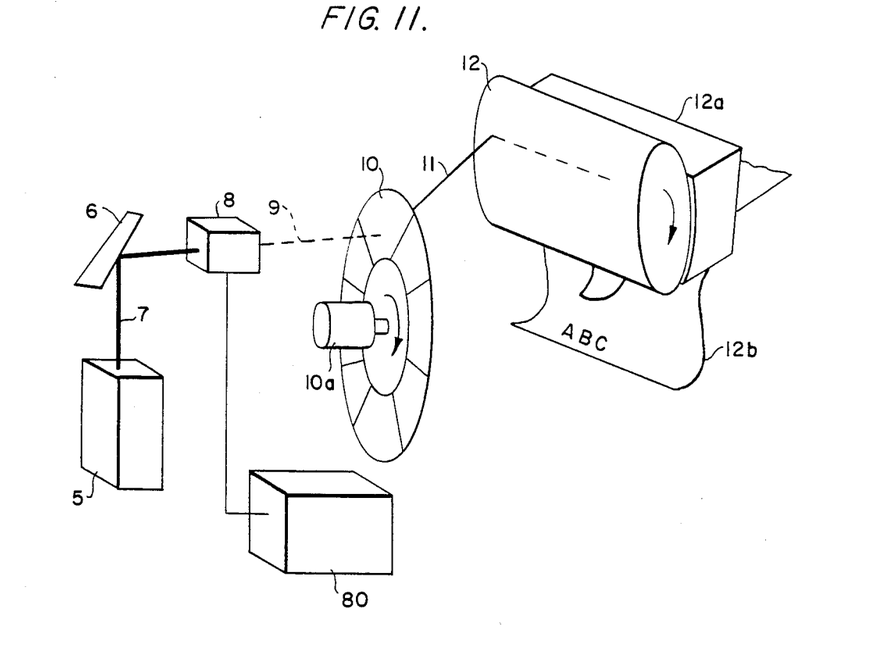
FIG. 11 and FIG. 12 are perspective views of other modifications obtained by adapting the light scanning apparatus of the present invention.

FIG. 11 is another embodiment of the present invention. In this figure, 5 is, laser source; 6 is, mirror, 7 is the reconstruction beam, 8 is a light modulator, 80 is a control unit, 9 is a modulated reconstruction beam, 10 is the hologram disk, 10a is the motor, 11 is a scanning beam, 12 is the photo-sensitive drum, 12a is a developer, and 12b is a print sheet.

The hologram disk 10 is arranged on the disk as in the case of the hologram disk indicated in FIG. 2, FIG. 7 or FIG. 9. The hologram disk 10 rotates by means of the motor 10a.

The reconstruction beam 7 emitted from the laser source 5 (having a continously adjustable wavelength for the wavelength the reconstruction beam) is reflected by the mirror 6 and then enters the light modulator 8. The light modulator 8 turns ON and OFF the incident light beam in accordance with the control signal.

The control signal is supplied from the control unit 80. The control unit 80 generates the control signals corresponding to white and black for the case in which an image to be printed is equally divided in the horizontal direction.

The light modulator 8 outputs the modulated reconstruction beam 9 by modulating said reconstruction beam 7 with this control signal.

As explained above, this output beam 9 is irradiated onto the hologram disk 10 which is rotated by the motor 10a. The hologram disk 10 diffracts the modulated reconstruction beam based on the abovementioned principle through its rotation.

The modulated reconstruction beam linearly scans the photo-sensitive drum.

The photo-sensitive drum is sensitive to this beam and forms an electrostatic latent image on the surface.

The photo-sensitive drum 12 forming a latent image on the surface rotates in the direction indicated by the arrow. The developer 12a develops and fixes a latent image on the drum onto the print sheet 12b.

Thereby, the letters to be printed by the control unit 80 are printed on the print sheet 12b.

Figure 12:
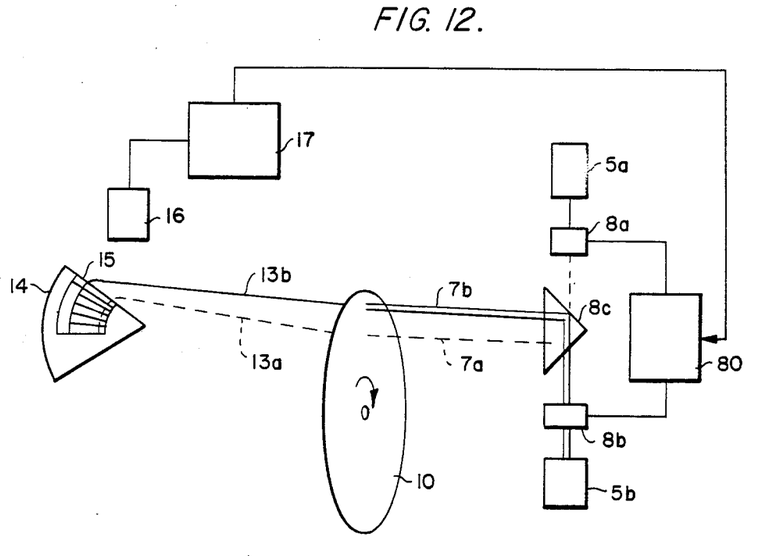

FIG. 12 shows the block diagram of the optical code reader attained by adopting the scanning apparatus of the present invention.

In this figure, 5a, 5b are light sources outputting laser beams of different wavelengths. 8a, 8b are light switches. 8c is a prism mirror. 80 is a control unit. The control unit 80 selectively operates each light switch. 7a, 7b are reconstruction beams of different wavelengths. 13a, 13b are scanning beams. 14 is a cone allowing attachment a bar code label 15 on the surface. 16 is a photo-detector which converts the reflected beam into an electrical signal. 17 is a decoder which decodes the bar code printed on the bar code label 15 from the output signal of photo-detector 16. 10 is a hologram disk which rotates as explained above.

The operation will be explained below. The control unit 80 activates the switch 8a for shielding the light beam of the light source 5a. Thereby, the light beam of light source 5b becomes the reconstruction beam 7b of the hologram 10 via the switch 8b and prism mirror 8c. The wavelength of this reconstruction beam 7b is so selected that the ratio to the construction wavelength becomes for example 1.5. Therefore, the scanning beam 13b scanned by the hologram 10 scans on the curve with a large radius of curvature. As a result, the light spots move around the area at the bottom of the cone 14.

The light beam reflected from the bar code label 15 is detected by the photo-detector 16. An output signal therefrom is decoded by the decoder 17. In case the decoder 17 does not receive a signal corresponding to the reflected beam during the read-out scanning, it informs to the control unit 80. Thereby, the control unit 80 opens the switch 8b. When the switch 8a opens, the reconstruction beam 7a is irradiated onto the hologram 10.

The wavelength of this reconstruction beam 7a is so adjusted, for example, that the ratio with the wavelength of the construction beam becomes, for example, 1.3. The scanning beam 13a by the reconstruction beam 7a results in smaller curvature of scanning locus than that obtained of the scanning beam 13b because the wavelength ratio is different. Therefore, a periphery of the cone near the top is scanned. Thus, when a label 15 is attached on the cone near the top, it is read by this beam 13a.

In the case of the present invention, the hologram shift locus may be linear and such a shift locus can be selected freely in accordance with the light spot locus to be scanned.

As explained above, in the present invention, the scanning line locus can be changed, the linearity in the specified plane can be improved and a longer scanning line can also be obtained by giving the difference between the wavelength of the coherent light beam for the hologram construction and the wavelength of the reconstruction coherent beam. Therefore, highly accurate linear scanning can be realized in the field of application without using an external compensating optical system, thus greatly contributing to reduction in size and cost down of the scanning apparatus.

What we claim is:

1. A method for controlling the shape of a scanning locus of a light beam of a reconstruction wavelength on a surface of an object to be scanned, comprising the steps of
   providing a reconstruction beam with said reconstruction wavelength, and
   moving said reconstruction beam across a hologram mounted on a disc by means of rotating said disc about a rotation axis,
   wherein said hologram has interferences fringes produced by interferring an object wave and a reference wave of a construction wavelength that is different from said reconstruction wavelength, said reference wave having a focus at a distance F from said hologram being produced, said interference fringes of said hologram define an optical axis of said hologram, said optical axis and said axis of rotation are arranged in parallel and spaced a distance R apart, and the value of said reconstruction wavelength, and said distances F and R, are determined to provide a selected shape of said scanning locus of said reconstruction beam on said surface to be scanned, as diffracted by said hologram on said rotating disc.

2. The method of claim 1, wherein said selected shape of said scanning locus lies within a respective plane that contacts said selected surface along said scanning locus.

3. The method of claim 2, wherein said surface to be scanned is a conical surface arranged with its axis parallel to said axis of rotation.

4. The method of claim 2, wherein said surface to be scanned is cylindrical with a respective cylinder axis, and said scanning locus extends along said cylindrical surface in a line that is parallel to the cylinder axis.

5. The method of claim 1 or 2, wherein said value of said reconstruction wavelength is selected so that said scanning locus is a straight line.

6. The method of claim 5, wherein the ratio of said reconstruction wavelength to said construction wavelength is selected to be 1.7.

7. The method of claim 5, wherein the length of said straight scanning locus includes a portion about 300 mm long.

8. The method of claim 1 or 2, wherein said object wave is a plane wave and said reference wave is a sperical wave.

9. The method of claim 1 or 2, wherein said object wave is a cylindrical wave and said said reference wave is a spherical wave.

10. The method of claim 1 or 2, wherein said object wave is a divergining spherical wave and said reference wave is a converging spherical wave.

11. The method of claim 1 or 2, wherein said reconstruction wavelength is larger than said construction wavelength.

* * * * *

UNITED STATES PATENT AND TRADEMARK OFFICE
CERTIFICATE OF CORRECTION

PATENT NO. : 4,639,071

DATED : January 27, 1987

INVENTOR(S) : Seikichi Matsumoto and Hiroyuki Ikeda

It is certified that error appears in the above-identified patent and that said Letters Patent is hereby corrected as shown below:

Column 1, line 10, "hologram" should be --hologram,--;
line 33, after "on" insert --a--;
line 52, "the" (before "disk") should be --a-- and after "arranging" insert --the--.

Column 2, line 64, after "disk 1," insert --and--.

Column 3, line 7, after "less" insert --density--;
line 22, delete "that which" and insert --with--;
line 25, "1a" should be --1A--;
line 49, delete "and" (first occurrence);

Column 4, line 16, "sherical" should be --spherical--;
line 25, "axis thereby" should be --axis. Thereby--;
line 31, delete "this".

Column 5, in the line proceeding equation 6, "d Φ = 2" should be --dΦ = 2π --.
line 19, delete "(Fig. 5)" and after "directions" insert --, respectively--;
line 26, after "β" insert --(Fig. 5)--;
line 47, (Equation 11), "$\frac{\lambda R}{EC}$" should be --$\frac{\lambda R}{EC}$--
line 62, "Y" should be --Y'--;
line 63, "X" should be --X'--.

UNITED STATES PATENT AND TRADEMARK OFFICE
CERTIFICATE OF CORRECTION

PATENT NO. : 4,639,071
DATED : January 27, 1987
INVENTOR(S) : Seikichi Matsumoto and Hiroyuki Ikeda It is certified that error appears in the above-identified patent and that said Letters Patent is hereby corrected as shown below:

Column 6, line 32, "Parameter" should be --Parameters--;
          line 59, "radisu" should be --radius--;
          line 63, "X, Y" should be --X', Y'--.

Column 7, line 17, "to" should be --the--;
          line 18, "the" (first occurrence) should be --a--;
          line 21, "is" should be --are--;
          line 22, "forms" should be --form--;
          line 38, delete "500 mm";
          line 41, in the column of numerical values and in alignment with "(L):" insert --500 mm--;
          line 46, "which)" should be --which--;
          line 66, delete "the".

Column 8, line 9, "coresponds" should be --corresponds--;
          line 13, "axis" should be --axes--;
          line 23, "is," should be --is--; and "source;" should be --source,--;
          line 25, "the" should be --a--;
          line 26, "the" should be --a--;
          line 27, "the" should be --a--.

Column 10, line 10, "interferences" should be --interference--;

UNITED STATES PATENT AND TRADEMARK OFFICE
CERTIFICATE OF CORRECTION

PATENT NO. : 4,639,071
DATED : January 27, 1987
INVENTOR(S) : Seikichi Matsumoto et al Page 3 of 3

It is certified that error appears in the above-identified patent and that said Letters Patent is hereby corrected as shown below:

Column 10, line 48, delete "said" (first occurrence);
line 51, "divergining" should read
-- diverging --

Signed and Sealed this

First Day of September, 1987

Attest:

DONALD J. QUIGG

Attesting Officer

Commissioner of Patents and Trademarks